US007484463B2

(12) United States Patent
Li

(10) Patent No.: US 7,484,463 B2
(45) Date of Patent: *Feb. 3, 2009

(54) PERMANENT MAGNETIC LEVITATION APPARATUS

(76) Inventor: Lingqun Li, Tower A, Bldg.,No.14,Chuangye Yuan, Shuang D Gang, Gaoxunyuanqu, No.12 Liaohedonglu Dalian, 116620 (CN)

( * ) Notice: Subject to any disclaimer, the term of this patent is extended or adjusted under 35 U.S.C. 154(b) by 257 days.

This patent is subject to a terminal disclaimer.

(21) Appl. No.: 11/413,549

(22) Filed: Apr. 28, 2006

(65) Prior Publication Data

US 2006/0243158 A1 Nov. 2, 2006

(51) Int. Cl.
*B60L 13/04* (2006.01)
*B60L 13/06* (2006.01)

(52) U.S. Cl. ...................................... 104/281; 104/284

(58) Field of Classification Search ................. 104/281, 104/284, 282, 283, 285, 286
See application file for complete search history.

(56) References Cited

U.S. PATENT DOCUMENTS 6,510,799 B2 * 1/2003 Lamb et al. ................. 104/281
6,633,217 B2 * 10/2003 Post ........................... 335/306
6,664,880 B2 * 12/2003 Post ........................... 335/306
6,827,022 B2 * 12/2004 van den Bergh et al. .... 104/284
6,899,036 B2 5/2005 Lamb et al.
7,243,604 B2 * 7/2007 Li ............................. 104/139
7,314,008 B2 * 1/2008 Li ............................. 104/281
2002/0163329 A1 * 11/2002 D'Alpaos et al. ...... 324/207.16
2003/0205163 A1 11/2003 Lamb et al.
2005/0223934 A1 * 10/2005 Li ............................. 104/123
2005/0252407 A1 * 11/2005 Li ............................. 104/139
2006/0243157 A1 * 11/2006 Li ............................. 104/281
2006/0243158 A1 * 11/2006 Li ............................. 104/281

FOREIGN PATENT DOCUMENTS

CN 1557650 A 1/2004

OTHER PUBLICATIONS

Wei, Qingchao and Kong, Younjian: "Magnetic Levitation Railway System and Technique", p. 19, para. 4, Ch. 1, *China Science and Technology Publ. Co.*, Nov. 2003.

* cited by examiner

*Primary Examiner*—S. Joseph Morano
*Assistant Examiner*—Jason C Smith
(74) *Attorney, Agent, or Firm*—Hunton & Williams LLP

(57) ABSTRACT

A permanent magnetic levitation apparatus comprises a permanent magnetic track unit and permanent magnetic levitation wing unit provided on a magnetic levitation vehicle and levitated above the track unit, in which the wing unit includes a ferromagnetic wing trough having an open bottom, wing permanent magnets disposed in the wing trough, and non-ferromagnetic spacers which are disposed between the side walls of the wing trough and the wing permanent magnets, and the track unit includes a ferromagnetic track trough having an open top, track permanent magnets disposed in the track trough, and non-ferromagnetic spacers disposed between the side walls of the track trough and the track permanent magnets, so that the wing permanent magnets and the track permanent magnets are disposed so that their poles with the same polarity face each other.

9 Claims, 2 Drawing Sheets

3
1a
2
4
4
5
5
6
6
1
1b

PERMANENT MAGNETIC LEVITATION APPARATUS

BACKGROUND OF THE INVENTION

1. Technical Field of the Invention

The present invention relates to a technique of permanent magnetic levitation vehicle, and more particularly, to a permanent magnetic levitation apparatus comprising a permanent magnetic track unit and a permanent magnetic levitation wing unit.

2. Description of the Related Art

The levitation forces of the permanent magnetic levitation vehicle are resulted from the repulsion forces generated between the poles of the track permanent magnets and the poles of vehicle permanent magnets having the same polarity with that of the poles of the track permanent magnets and facing the track permanent magnets. The current permanent magnets provided on the track unit and the vehicle are formed by directly fixing permanent magnetic material on ferromagnetic based plates respectively. The above method is effective, however loss of the rest energy is high and the amount of the expensive hard-magnetic material such as NdFeB use for the permanent magnets is increased, so that the manufacture cost is increased and resources are wasted.

The above-mentioned levitation techniques are referred to the Chinese Patent Publication No. CN1264660A entitled "tube vacuum permanent magnetic compensation type levitation train-elevated railway-station system".

SUMMARY OF THE INVENTION

One aspect of the present invention is to solve at least part of the above problems associated with the prior art.

One embodiment of the present invention provides a permanent magnetic levitation apparatus, comprising:

a permanent magnetic track unit including:

a ferromagnetic track trough which is open at a top thereof and has a first side wall and a second wall opposed to each other, first and second track permanent magnets disposed in the track trough, in which a N pole of the first track permanent magnet and a S pole of the second track permanent magnet are positioned at the open top of the track trough, first and second non-ferromagnetic spacers which are disposed between the first side wall of the track trough and the first track permanent magnet and between the second side wall of the track trough and the second track permanent magnet, respectively, a permanent magnetic levitation wing unit on a magnetic levitation vehicle, the permanent magnetic levitation wing being levitated above the permanent magnetic track unit and including:

a ferromagnetic wing trough which is open at a bottom thereof and has a first side wall and a second side wall opposed to each other, in which the open bottom of the wing trough corresponds to and faces the open top of the track trough, first and second wing permanent magnets disposed in the wing trough and correspond to the first and second track permanent magnets respectively, in which a N pole of the first wing permanent magnet and a S pole of the second wing permanent magnet are positioned at the open bottom of the wing trough, third and fourth non-ferromagnetic spacers which are disposed between the first side wall of the wing trough and the first wing permanent magnet and between the second side wall of the wing trough and the second wing permanent magnet respectively, wherein the first wing permanent magnet has a width substantially equal to that of the corresponding first track permanent magnet, and the second wing permanent magnet has a width substantially equal to that of the corresponding second track permanent magnet.

According to another embodiment, the first and second wing permanent magnets are respectively provided with countersinks for fixing the first and second wing permanent magnets to a top of the wing trough by means of screws, and wherein the top of the wing trough is provided with countersinks for mounting the ferromagnetic wing trough to a wing base for the vehicle.

According to still another embodiment, the first and second track permanent magnets are respectively provided with countersinks for fixing the first and second track permanent magnets to a bottom of the track trough by means of screws, and wherein the bottom of the track trough is provided with countersinks for mounting the track trough to a track base.

Preferably, a thickness of each of the first and second wing permanent magnets is approximately 1 to 3 times larger than that of each of the first and second track permanent magnets.

More preferably, the thickness of each of the first and second wing permanent magnets is approximately 2 times larger than that of each of the first and second track permanent magnets.

According to the present invention, when the first and second wing permanent magnets are mounted in the ferromagnetic wing trough and the first and second track permanent magnets are mounted in the ferromagnetic track trough, magnetic force lines of approximately parabola shape are generated from the N pole of the first wing permanent magnet to the S pole of the second wing permanent magnet and from the N pole of the first track permanent magnet to the S pole of the second track permanent magnet. In addition, first sub magnetic force lines of approximately parabola shape are generated from the N pole of the first wing permanent magnet to the first side wall of the wing trough, from the second side wall of the wing trough to the S pole of the second wing permanent magnet, in which the first sub magnetic force lines between the N pole of the first wing permanent magnet and the first side wall of the wing trough are symmetrical in shape with that between the second side wall of the wing trough and the S pole of the second wing permanent magnet. Similarly, second sub magnetic force lines of approximately parabola shape are generated from the N pole of the first track permanent magnet to the first side wall of the track trough and from the second side wall of the track trough to the S pole of the second track permanent magnet, in which the second sub magnetic force lines between the N pole of the first track permanent magnet and the first side wall of the track trough are symmetrical in shape with that between the second side wall of the track trough and the S pole of the second track permanent magnet. Because the magnetic conductivity of the ferromagnetic metal is almost infinite times larger than that of the air, almost all of the static magnetic energy are concentrated on a surface of open magnetic field, i.e. the open top of the track trough and the open bottom of the wing trough.

DETAILED DESCRIPTION OF THE PREFERRED EMBODIMENTS

Embodiments of the present invention will be described in detail with reference to the accompany drawings, the embodiments described herein are explanatory and illustrative and can not be construed to limit the present invention.

Figure 1:
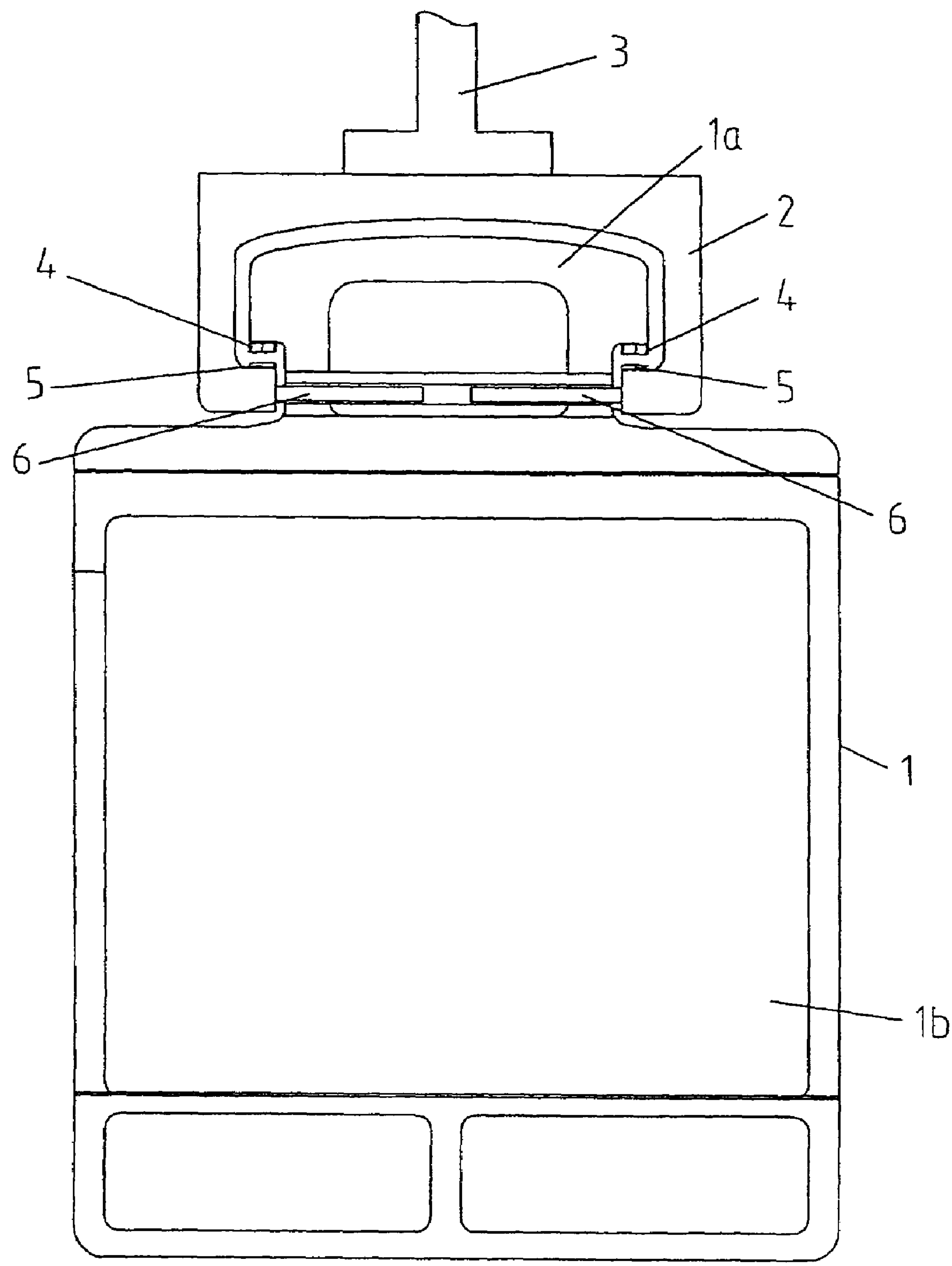
FIG. 1 is a schematic view showing a suspending track magnetic levitation vehicle system with the permanent magnetic levitation apparatus according to an embodiment of the present invention.

FIG. 1 is a schematic view showing a suspending track magnetic levitation vehicle system with the permanent magnetic levitation apparatus according to an embodiment of the present invention. As shown in FIG. 1, a magnetic levitation vehicle 1 comprises a magnetic levitation cabin 1*a* at an upper portion thereof and a compartment 1*b* at a lower portion thereof. The magnetic levitation cabin 1*a* is levitated in a suspending arch crosstie 2 which is fixed to a lower portion of a I beam 3. Permanent magnetic levitation wings 4 are symmetrically disposed at two sides of the magnetic levitation cabin 1*a* and levitated above permanent magnetic tracks 5 respectively. The magnetic levitation cabin 1*a* is centrally supported between two tracks 5 by means of guide wheels 6.

Figure 2:
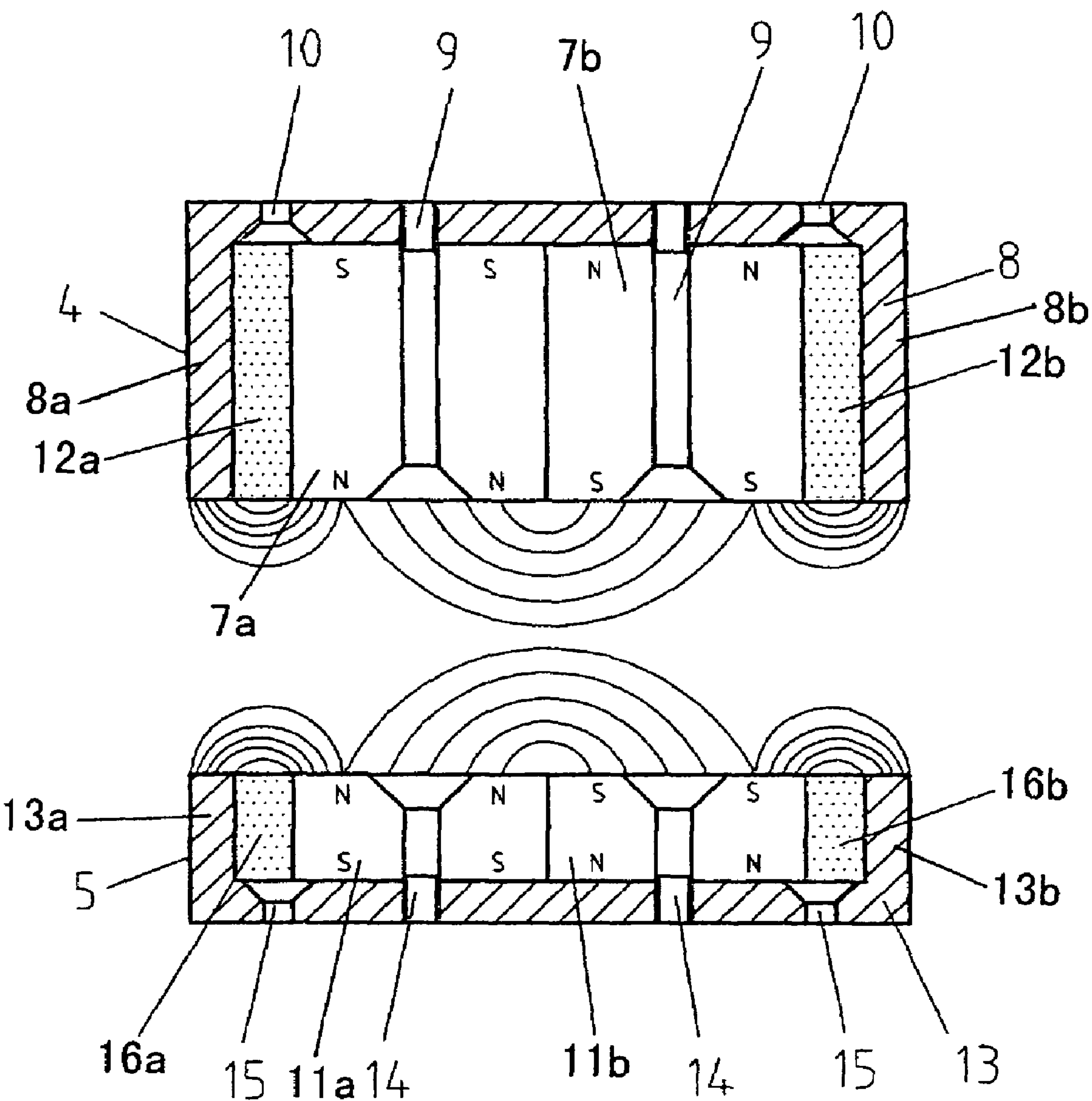
FIG. 2 is a schematic view showing the structure and magnetic force line distribution of the permanent magnetic levitation apparatus according to the embodiment of the present.

FIG. 2 is a schematic view showing the structure and magnetic force line distribution of the permanent magnetic levitation apparatus according to the embodiment of the present, in which a permanent magnetic levitation wing unit 4 and a permanent magnetic track unit 5 of the permanent magnetic levitation apparatus according to this embodiment of the present invention are shown. The poles of the permanent magnetic levitation wing unit 4 and the poles of the permanent magnetic track unit 5 having the same polarity with those of the permanent magnetic levitation wing unit 4 face with each other, and the permanent magnetic levitation wing unit 4 is levitated above the permanent magnetic track unit 5.

As shown in FIG. 2, the permanent magnetic track unit 5 comprises a ferromagnetic track trough 13, in which a top (the upper side in FIG. 2) of the ferromagnetic track trough 13 is open (that is, the ferromagnetic track trough 13 is opened upwardly) and the ferromagnetic track trough 13 has a first side wall 13*a* and a second wall 13*b* opposed to each other. First and second track permanent magnets 11*a* and 11*b*, for example, made of NdFeB, are disposed in the ferromagnetic track trough 13, in which a N pole of the first track permanent magnet 11*a* and a S pole of the second track permanent magnet 11*b* are located at the open top (the upper side in FIG. 2) of the ferromagnetic track trough 13.

The first and second track permanent magnets 11*a* and 11*b* are provided with countersinks 14 at center portions thereof respectively, the countersinks 14 are used for fixing the first and second track permanent magnets 11*a* and 11*b* to a bottom of the track trough 13 by means of screws. A countersink 15 is provided at each side of the bottom of ferromagnetic track trough 13 and used for fixing the ferromagnetic track trough 13 to a track base (see FIG. 1) by means of screws. First and second non-ferromagnetic spacers 16*a* and 16*b*, for example, made of aluminum alloy, are disposed between the first side wall 13*a* of the track trough 13 and the first track permanent magnet 11*a* and between the second side wall 13*b* of the track trough 13 and the second track permanent magnet 11*b*, respectively.

The permanent magnetic levitation wing unit 4 on a magnetic levitation vehicle comprises a ferromagnetic wing trough 8, and first and second wing permanent magnets 7*a* and 7*b* are disposed in the ferromagnetic wing trough 8. A bottom of the ferromagnetic wing trough 8 is open (that is, the ferromagnetic wing trough 8 is opened downwardly) and the ferromagnetic wing trough 8 has a first side wall 8*a* and a second side wall 8*b* opposed to each other, that is, the open bottom of the ferromagnetic wing trough 8 corresponds to and faces the open top of the ferromagnetic track trough 13. The first and second wing permanent magnets 7*a* and 7*b* correspond to and face the first and second track permanent magnets 11*a* and 11*b*, and a N pole of the first wing permanent magnet 7*a* and a S pole of the second wing permanent magnet 7*b* are located on the open bottom of the ferromagnetic wing trough 8, so that the N pole of the first wing permanent magnet 7*a* faces the N pole of the first track permanent magnets 11*a*, and the S pole of the second wing permanent magnet 7*b* faces the S pole of the second track permanent magnets 11*b*.

Alternatively, a S pole of the first track permanent magnet 11*a* and a N pole of the second track permanent magnet 11*b* may be located at the open top of the ferromagnetic track trough 13, and the S pole of the first wing permanent magnet 7*a* and the N pole of the second wing permanent magnet 7*b* are located on the open bottom of the ferromagnetic wing trough 8, so that the S pole of the first wing permanent magnet 7*a* faces the S pole of the first track permanent magnets 11*a*, and the N pole of the second wing permanent magnet 7*b* faces the N pole of the second track permanent magnets 11*b*.

A countersink 9 is provided in a central portion of each of the first and second wing permanent magnets 7*a* and 7*b* so as to fix the first and second wing permanent magnets 7*a* and 7*b* in the ferromagnetic wing trough 8 by means of screws. A countersink 10 is provided at each side of the top of ferromagnetic wing trough 8 and used for fixing the ferromagnetic wing trough 8 to a vehicle wing base (see FIG. 1) by means of screws. Third and fourth non-ferromagnetic spacers 12*a* and 12*b*, for example, made of aluminum alloy, are disposed between the first side wall 8*a* of the wing trough 8 and the first wing permanent magnet 7*a* and between the second side wall 8*b* of the wing trough 8 and the second wing permanent magnet 7*b*, respectively.

The first wing permanent magnet 7*a* has width (size in ring-and-left direction in FIGS. 1 and 2) substantially equal to that of the corresponding first track permanent magnet 11*a* and the second wing permanent magnet 7*b* has a width (size in ring-and-left direction in FIGS. 1 and 2) substantially equal to that of the corresponding second track permanent magnet 11*b*.

According to this embodiment of the present invention, when the first and second wing permanent magnets 7*a* and 7*b* and the first and second track permanent magnets 11*a* 11*b* are disposed in the wing trough 8 and the track trough 13 respectively, magnetic force lines of approximately parabola shape are generated from the N pole of the first wing permanent magnet 7*a* to the S pole of the second wing permanent magnet 7*b*. Similarly, magnetic force lines of approximately parabola shape are generated from the N pole of the first track permanent magnet 11*a* to the S pole of the second track permanent magnet 11*b*.

In addition, first sub magnetic force lines of approximately parabola shape are generated from the N pole of the first wing permanent magnet 7*a* to the first side wall 8*a* of the wing trough 8, and from the second side wall 8*b* of the wing trough 8 to the S pole of the second wing permanent magnet 7*b*, in which the first sub magnetic force lines between the N pole of the first wing permanent magnet 7*a* and the first side wall 8*a* of the wing trough 8 are symmetrical in shape with that between the second side wall 8*b* of the wing trough 8 and the S pole of the second wing permanent magnet 7*b*, similarly, second sub magnetic force lines of approximately parabola shape are generated from the N pole of the first track permanent magnet 11*a* to the first side wall 13*a* of the track trough 13 and from the second side wall 13*b* of the track trough 13 to the S pole of the second track permanent magnet 11*b*, in which the second sub magnetic force lines between the N pole of the first track permanent magnet 11*a* and the first side wall 13*a* of the track trough 13 are symmetrical in shape with that between the second side wall 13*b* of the track trough 13 and the S pole of the second track permanent magnet 11*b*.

As described above, the first sub magnetic force lines of approximately parabola shape is from the N pole of the first wing permanent magnet 7*a* to the first side wall 8*a* of the wing trough 8 on one side of the wing trough 8 and from the second side wall 8*b* of the wing trough 8 to the S pole of the second wing permanent magnet 7*b* one the other side of the wing trough 8. Similarly, the second sub magnetic force lines of approximately parabola shape are from the N pole of the first track permanent magnet 11*a* to the first side wall 13*a* of the track trough 13 on one side of the track trough 13 and from the second side wall 13*b* of the track trough 13 to the S pole of the second track permanent magnet 11*b* on the other side of the track trough 13.

Because the magnetic conductivity of the ferromagnetic metal is almost infinite times larger than that of the air, almost all of the static magnetic energy is concentrated on a surface of open magnetic field, i.e. the open top of the track trough 13 and the open bottom of the wing trough 8.

The wing trough 8 has a wall thickness substantially equal to that of the track trough 13 and the thicknesses of the first and second non-ferromagnetic spacers 16*a* and 16*b* in the track trough 13 are substantially equal to that of the third and fourth non-ferromagnetic spacers 12*a* and 12*b* in the wing trough 8. The first wing permanent magnet 7*a* has a width substantially equal to that of the corresponding first track permanent magnet 11*a*, and the second wing permanent magnet 7*b* has a width substantially equal to that of the corresponding second track permanent magnet 11*b*.

Preferably, thicknesses of the first and second wing permanent magnets 7*a* and 7*b* are approximately 1 to 3 times larger than that of the first and second track permanent magnets 11*a* and 11*b*, more preferably, thicknesses of the first and second wing permanent magnets are approximately 2 times larger than that of the first and second track permanent magnets. Such thickness ratio results in that less track magnets are used and a desirable levitation effects are obtained.

The magnetic levitation vehicle employed the permanent magnetic levitation apparatus according to the present invention has following advantages:

1. the amount of the track magnets used in the present invention is decreased by about 50%;

2. the levitation force is increased by about 48%;

3. the magnetic circuit is unobstructed and the permanent magnets are not easy to be demagnetized.

While preferred embodiments of the invention have been described and illustrated above, it should be understood that these are exemplary of the invention and are not to be considered as limitation. Additions, omissions, substitutions and other modifications can be made without departing from the spirit or scope of the present invention. Accordingly, the invention is not to be considered as being limited by the foregoing description, and is only limited by the scope of the appended claims and the equivalents thereof.

What is claimed is:

1. A permanent magnetic levitation apparatus, comprising:

a permanent magnetic track unit including:

a ferromagnetic track trough which is open at a top thereof and has a first side wall and a second wall opposed to each other, first and second track permanent magnets disposed in the track trough, in which a N pole of the first track permanent magnet and a S pole of the second track permanent magnet are positioned at the open top of the track trough, first and second non-ferromagnetic spacers which are disposed between the first side wall of the track trough and the first track permanent magnet and between the second side wall of the track trough and the second track permanent magnet, respectively, a permanent magnetic levitation wing unit on a magnetic levitation vehicle, the permanent magnetic levitation wing being levitated above the permanent magnetic track unit and including:

a ferromagnetic wing trough which is open at a bottom thereof and has a first side wall and a second side wall opposed to each other, in which the open bottom of the wing trough corresponds to and faces the open top of the track trough, first and second wing permanent magnets disposed in the wing trough and correspond to the first and second track permanent magnets respectively, in which a N pole of the first wing permanent magnet and a S pole of the second wing permanent magnet are positioned at the open bottom of the wing trough, third and fourth non-ferromagnetic spacers which are disposed between the first side wall of the wing trough and the first wing permanent magnet and between the second side wall of the wing trough and the second wing permanent magnet respectively, wherein the first wing permanent magnet has a width substantially equal to that of the corresponding first track permanent magnet, and the second wing permanent magnet has a width substantially equal to that of the corresponding second track permanent magnet, thereby magnetic force lines of approximately parabola shape are generated from the N pole of the first wing permanent magnet to the S pole of the second wing permanent magnet and from the N pole of the first track permanent magnet to the S pole of the second track permanent magnet, first sub magnetic force lines of approximately parabola shape are generated from the N pole of the first wing permanent magnet to the first side wall of the wing trough, and from the second side wall of the wing trough to the S pole of the second wing permanent magnet, in which the first sub magnetic force lines between the N pole of the first wing permanent magnet and the first side wall of the wing trough are symmetrical in shape with that between the second side wall of the wing trough and the S pole of the second wing permanent magnet, and second sub magnetic force lines of approximately parabola shape are generated from the N pole of the first track permanent magnet to the first side wall of the track trough and from the second side wall of the track trough to the S pole of the second track permanent magnet, in which the second sub magnetic force lines between the N pole of the first track permanent magnet and the first side wall of the track trough are symmetrical in shape with that between the second side wall of the track trough and the S pole of the second track permanent magnet.

2. The permanent magnetic levitation apparatus according to claim 1, wherein a thickness of each of the first and second wing permanent magnets is approximately 1 to 3 times larger than that of each of the first and second track permanent magnets.

3. The permanent magnetic levitation apparatus according to claim 2, wherein the thickness of each of the first and second wing permanent magnets is approximately 2 times larger than that of each of the first and second track permanent magnets.

4. The permanent magnetic levitation apparatus according to claim 1, wherein the first and second wing permanent magnets are respectively provided with countersinks for fixing the first and second wing permanent magnets to a top of the wing trough by means of screws, and wherein the top of the wing trough is provided with countersinks for mounting the wing trough to a wing base for the vehicle.

5. The permanent magnetic levitation apparatus according to claim 4, wherein a thickness of each of the first and second wing permanent magnets is approximately 1 to 3 times larger than that of each of the first and second track permanent magnets.

6. The permanent magnetic levitation apparatus according to claim 5, wherein the thickness of each of the first and second wing permanent magnets is approximately 2 times larger than that of each of the first and second track permanent magnets.

7. The permanent magnetic levitation apparatus according to claim 1, wherein the first and second track permanent magnets are respectively provided with countersinks for fixing the first and second track permanent magnets to a bottom of the track trough by means of screws, and wherein the bottom of the track trough is provided with countersinks for mounting the track trough to a track base.

8. The permanent magnetic levitation apparatus according to claim 7, wherein a thickness of each of the first and second wing permanent magnets is approximately 1 to 3 times larger than that of each of the first and second track permanent magnets.

9. The permanent magnetic levitation apparatus according to claim 8, wherein the thickness of each of the first and second wing permanent magnets is approximately 2 times larger than that of each of the first and second track permanent magnets.

* * * * *